United States Patent [19]
Aschoff et al.

[11] Patent Number: 4,469,166
[45] Date of Patent: Sep. 4, 1984

[54] AIR CONDITIONING DEVICE FOR POWER VEHICLE

[75] Inventors: Jörg Aschoff; Wolfgang Scheidel, both of Buhl, Fed. Rep. of Germany

[73] Assignee: Robert Bosch GmbH, Stuttgart, Fed. Rep. of Germany

[21] Appl. No.: 386,423

[22] Filed: Jun. 8, 1982

[30] Foreign Application Priority Data

Aug. 26, 1981 [DE] Fed. Rep. of Germany ....... 3133639

[51] Int. Cl.³ ............................................. F25B 29/00
[52] U.S. Cl. ...................................... 165/25; 98/2.06; 98/2.08; 74/626; 62/161
[58] Field of Search ........................ 165/24, 25, 26, 42, 165/43, 33; 236/13; 98/2.06, 2.08; 62/161; 251/130; 74/626

[56] References Cited

U.S. PATENT DOCUMENTS 2,397,068  3/1946  Wilson ................................. 74/626
3,794,293  2/1974  Matuda et al. ..................... 251/134
4,157,113  6/1979  Karran et al. ......................... 165/42
4,262,738  4/1981  Kato et al. ............................. 165/25
4,352,452 10/1982  Shimada et al. ...................... 236/13

FOREIGN PATENT DOCUMENTS 1170442  5/1964  Fed. Rep. of Germany ...... 251/130

Primary Examiner—William R. Cline
Attorney, Agent, or Firm—Michael J. Striker

[57] ABSTRACT

An air conditioning device has a control member, an electric motor arranged to be operatively connected with the control member and drive the latter, an actuating element arranged to sense air temperature and to actuate the electric motor, an interrupting element for interrupting the connection between the electric motor and the control member, and a manual adjustment member arranged for manually adjusting the control member upon interruption of the connection between the electric motor and the control member.

15 Claims, 5 Drawing Figures

AIR CONDITIONING DEVICE FOR POWER VEHICLE

BACKGROUND OF THE INVENTION

The present invention relates to an air conditioning device or air heating device for power vehicles. More particularly, it relates to an air conditioning device which has a control member formed advantageously as an air-regulating flap, an electric servomotor or adjusting motor arranged to drive the control member, and a temperature regulator having a temperature sensor and acting upon the electric motor.

Devices of the above mentioned general type are known in the art. One such device is disclosed, for example, in the U.S. Pat. No. 2,284,764. This device has a warm air supply passage and a cold air supply passage which both merge into an air passage in the interior of the vehicle. In the region of transition, the above mentioned control member, formed as an air-regulating flap, is turnably mounted, and thereby blocks one or the other supply passage relative to the air passage. The air-regulating flap is adjustable by the electric adjusting motor via a reduction transmission. The adjusting motor is connected with a control device having at least one temperature sensor. It cannot be excluded that the control device has a defect, and that the adjusting motor forces the air-regulating flap to one of its two possible positions and, particularly when the reduction transmission is formed as a worm transmission, fixedly holds the flap in its position. When, in the event of freezing temperatures, the warm air supply passage is blocked because of such defect, it is not possible to defrost the windshield. In modern air conditioning or air heating devices, the control device is provided with transistors. When a defect occurs in the transistors, an expert, particularly in electronics, must be found. Such experts are not available as often as mechanics.

In the air conditioning device disclosed in U.S. Pat. No. 4,216,822, a vaporizer is arranged in a passage behind a blower which aspirates air and completely fills the cross section of the passage. A heater through which motor-cooling water flows is arranged behind the vaporizer at a distance therefrom and only partially fills the cross section of the passage, so that a bypass cross section remains free. A regulating flap is arranged in the passage such that the bypass cross section can be selectively closed or opened to any width. The regulating flap can be turned, as described in U.S. Pat. No. 2,284,764, with the aid of an electric adjusting motor and a reduction transmission. It is not guaranteed there that, in the event of defective control device or adjusting motor, the temperature of the air, at least for defrosting of windshields and heating the interior of the vehicle, can be adjusted.

SUMMARY OF THE INVENTION

Accordingly, it is an object of the present invention to provide an air conditioning device which avoids the disadvantages of the prior art.

More particularly, it is an object of the present invention to provide an air conditioning device for a power vehicle which, in event of a defect in the control device or in the adjusting motor, permits adjustment of the air temperature by hand.

In keeping with these objects, and with others which will become apparent hereinafter, one feature of the present invention resides, briefly stated, in an air conditioning device in which, in addition to motor means for driving a control member, means are provided for interrupting the connection between the electric motor and the control member, and further means for manually adjusting the control member upon interruption of the connection between the electric motor and the control member.

When the air conditioning device is designed in accordance with these features, it guarantees that, in the event of a defective control device or adjusting motor, the air temperature can still be adjusted, manually.

In accordance with another advantageous feature of the present invention, a planetary transmission is arranged between the electric motor and the control member and connects the former with the latter. The control member is connected with one planetary transmission element, such as a hollow shaft or a planetary wheel carrier, and the interrupting means includes the other of the planetary transmission elements, which is arranged rotatable for interrupting purposes, and a self-engaging arresting mechanism preventing rotation of the other planetary transmission element during driving of the control member by the electric motor, and a releasing element is arranged to release the arresting mechanism.

In accordance with still another advantageous feature of the present invention, the manual adjusting means includes a turnable adjusting lever provided with a disk which mounts the adjusting lever coaxially with the planetary wheel carrier, and the disk is provided with a cam and arranged so that, after releasing of the arresting mechanism, the disk is coupled with the one planetary transmission element which is fixedly connected with the control member. When the air conditioning device is designed in accordance with these features, it has a very compact construction and also guarantees that the manual adjusting means is immovable during the driving of the air-regulating flap by the motor, so as to exclude the danger of injury to vehicle passengers.

A further feature of the present invention is that the arresting mechanism include an arresting pin extending substantially radially to the turning axis of the adjusting lever and loaded with a spring, and a recess provided in the other planetary transmission element and associated with the arresting pin, wherein a cam is arranged to act radially on the arresting pin.

Still a further feature of the present invention is that the adjusting lever is provided with an abutment arranged so that, after releasing of the arresting mechanism, the abutment, during turning of the adjusting lever in its turning direction, engages a follower provided on the one planetary transmission element and formed as a pin. The recess and the cam can be arranged adjacent to one another, so that one portion of the arresting pin extends toward the cam, whereas another portion of the arresting pin extends into the recess.

When the air conditioning device is provided with the latter mentioned features, this contributes to compact construction of the device.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
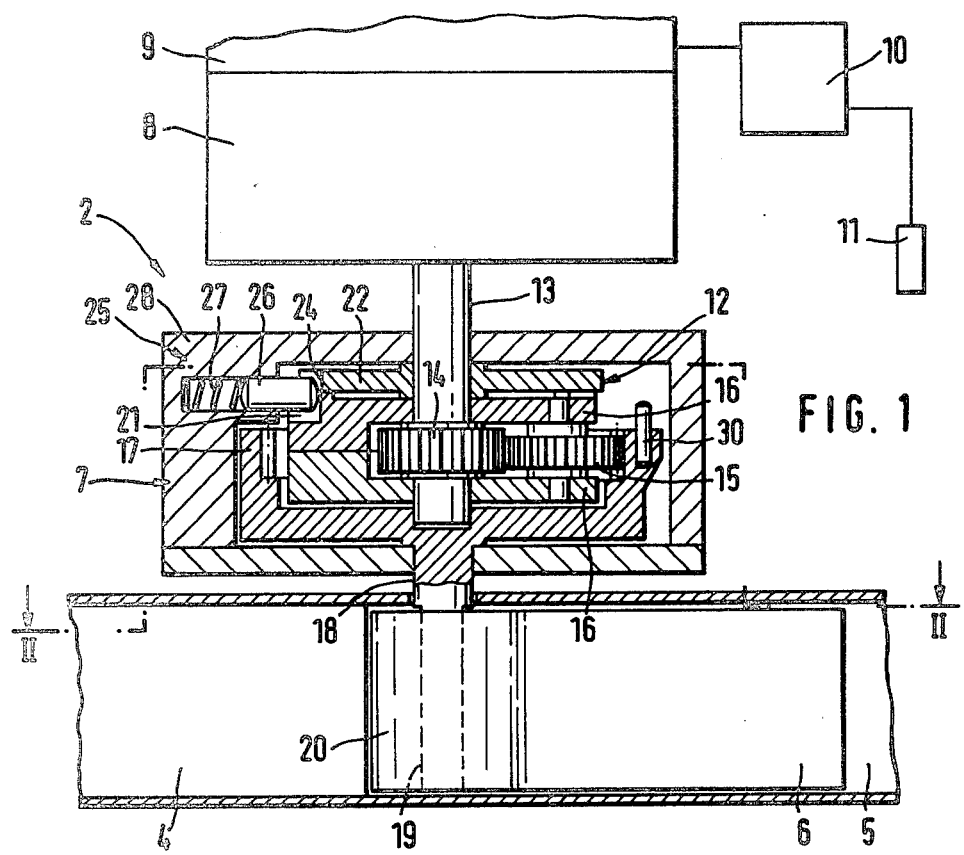
FIG. 1 is a view showing a longitudinal section of an air conditioning device during its automatic operation, in accordance with the present invention.

An air conditioning device for a power vehicle in accordance with the present invention is identified in toto by reference numeral 2. The air conditioning device 2 has a warm air supply passage 3, a cold air supply passage 4, and an air passage 5 which leads into the interior of the power vehicle and/or to defrosting nozzles. It further has a control member 6 which is formed as a turnable air-regulating flap, a planetary transmission 7, a reducing transmission 8, an electrical adjusting or servo motor 9, a temperature regulator 10 with a temperature sensor 11, and a manual adjusting device 12.

The warm air supply passage 3 and the cold air supply passage 4 lead to the air-regulating flap 6 and to the air passage 5. A not shown heating element, such as a heating coil, is arranged in the warm air supply passage 3. The cold air supply passage 4 has a not shown vaporizer for the case when the device is formed as an air conditioning device. Depending upon the position of the air-regulating flap, cold or unheated air, warm air, or a mixture of both of these is supplied into the air passage. The first option is provided when the air-regulating flap is in its position shown in FIG. 2.

The planetary transmission 7 has an input shaft 13 with a sun gear 14, several planetary gears 15, a planetary gear carrier 16 which is coaxial with the input shaft, and a hollow gear 17 surrounding the planetary gears 15 and provided with an output shaft 18. The output shaft 18 transits into a portion with two flat faces 19 on which a hub 20 of the air-regulating flap 6 is fitted.

The planetary gear carrier 16 has at least one recess 21 on its periphery. A disk 22 is supported on the input shaft 13 and arranged adjacent to recess 21 and directly on the planetary gear carrier 16. An adjusting lever 23 extending radially outwardly is formed on the disk 22 and can be actuated by hand. A part of the periphery of the disk 22 forms a cam 24.

An arresting mechanism 25 includes an arresting pin 26 and a spring 27. The arresting pin 26 is guided radially toward the input shaft 13 in a housing 28 of the planetary transmission 7 and arranged so that a part of its cross section engages under the pressure of the spring 27 into the recess 21, whereas the other part (half) of its cross section can be engaged by the cam 24. The planetary gear carrier 16, the recess 21, the arresting mechanism 25 and the cam 24, as well as the disk 22 and the adjusting lever 23, together form means for interrupting the driving connection between the input shaft 13 and the output shaft 18.

Figure 2:
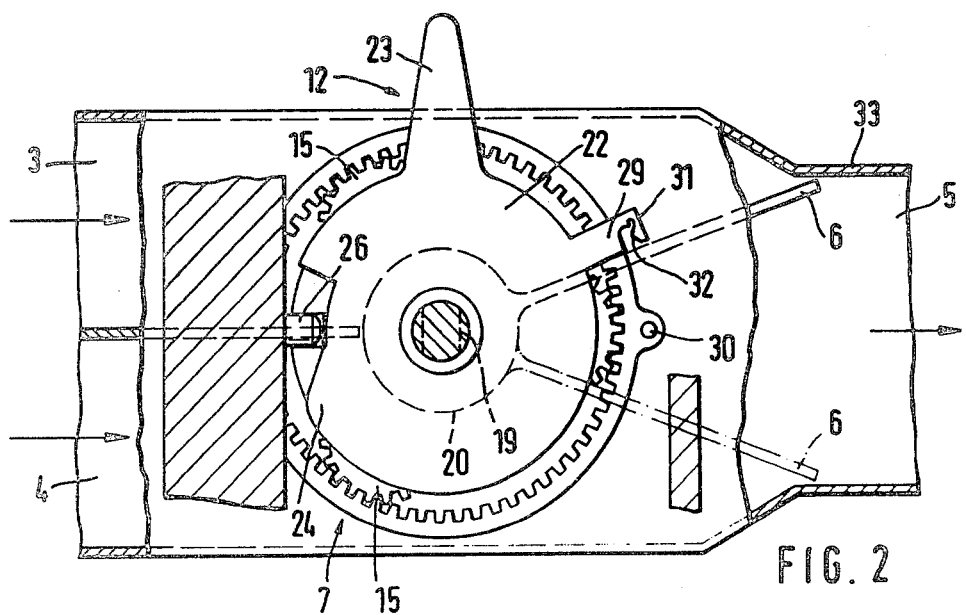
FIG. 2 is a plan view of the air conditioning device shown in FIG. 1.

A ray-like abutment 29 is formed on the disk 22. The hollow gear 17 has on its periphery a follower which is formed as a pin 30 and located in a movement plane of the abutment 29 determined by the input shaft 13. When, as shown in FIG. 2, the disk 22 is turned with the aid of the adjusting lever 23 in clockwise direction, the abutment 29 displaces against the pin 30. Thereby, when the arresting pin 26 is not in the recess 21, it is possible by turning the adjusting lever 23 to turn the hollow gear 17 in clockwise direction.

During turning of the adjustment lever 23, before the abutment 29 hits the pin 30, the cam 24 presses the arresting pin 26 from the recess 21. The adjusting lever 23, the abutment 29, the pin 30 and the hollow gear 17 together form manual adjusting means for the air-regulating flap 6. The manual adjusting means 12 acts on the air-regulating flap 6 first when a force-transmitting driving connection between the input shaft 13 and the hollow gear 17 is interrupted. As long as the adjusting lever 23 is located in its position shown in FIG. 2, the adjusting motor 9, which is switched in a known manner by the temperature sensor via the temperature regulator 10, turns via the reduction transmission 8 the input shaft 13, the sun gear 14, the planetary gears 15, and the hollow gear 17 with its output shaft 18, and thereby turns the air-regulating flap 6. During motor-driven turning of the air-regulating flap 6, the manual adjusting means 12 does not work.

If for some reason, for example because of a defect in the temperature regulator 10, the adjusting motor 9, or the reduction transmission 8, the air-regulating flap turns in the clockwise direction, then by turning the adjusting lever 23 first the hollow gear 17 is disengaged so that it can rotate freely, and then it acts upon the air-regulating flap 6. Thereby, any danger of injury to the operator is excluded, when the adjusting motor 9 must rotate the sun gear continuously in any suitable direction.

Figure 3:
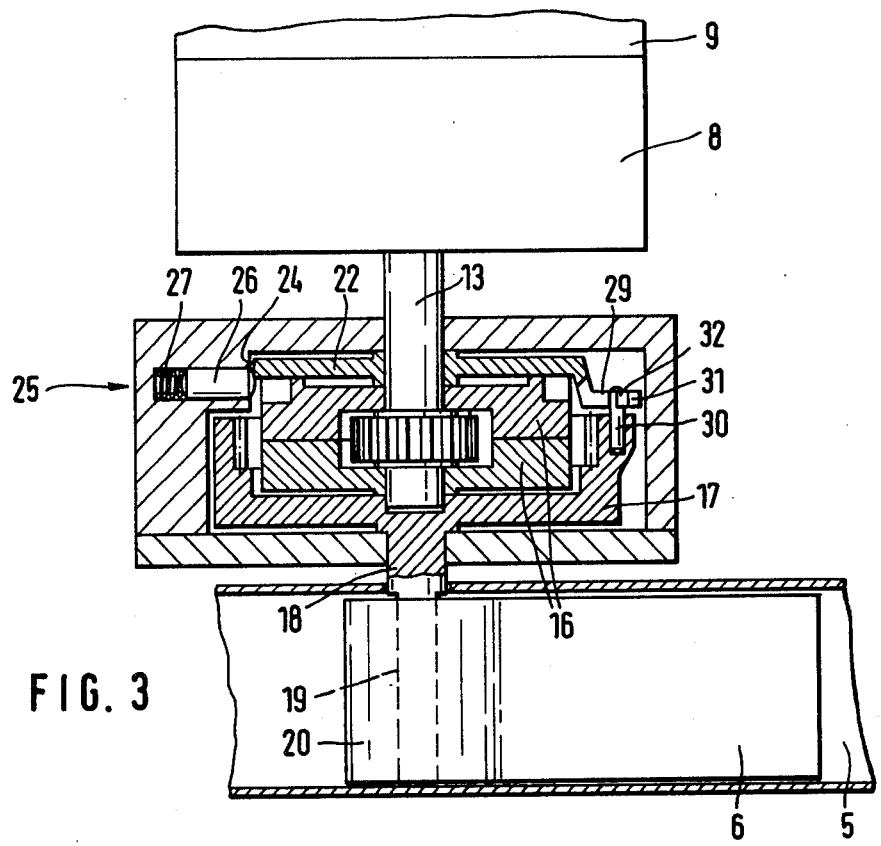
FIG. 3 is a longitudinal section of the air conditioning device of FIG. 1 during its manual operation.
Figure 4:
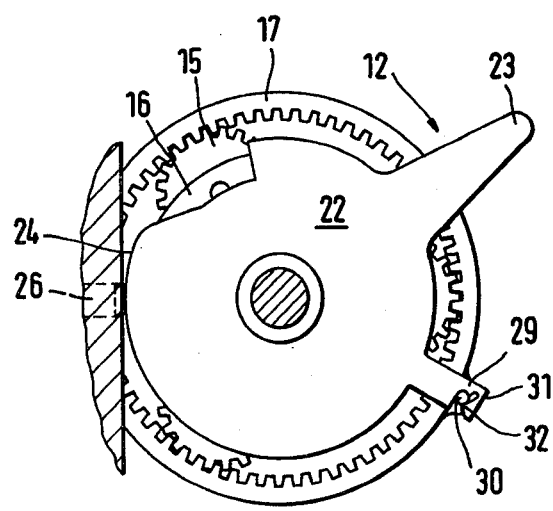
FIG. 4 is a view showing individual parts of the air conditioning device of FIG. 3, in a plan view.

When the air-regulating flap 6 must be turned in counterclockwise direction, for example when cold air must be supplied into the air passage 5, a spring 31 provided on the abutment 29 and carrying with its free end an arresting projection 32 extending radially to the driving axis 13 comes into effect. As soon as the abutment 29 is turned sufficiently against the pin 30, the arresting projection 32 meets the pin 30, elastically deflects it, and finally engages it over, as can be seen from FIGS. 3 and 4. Thereby the air-regulating flap 6 can be turned by hand from its position shown in broken lines in FIG. 2 in counterclockwise direction, until finally by abutment of the air-regulating flap 6 against a wall 33 of the air passage 5 the arresting projection 32 is separated from the pin 30 by arbitrary further turning of the abutment 29.

The possible turning angle of the abutment 29 is so dimensioned that, in the shown zero position of the adjusting lever 23 and motor-driven adjustment of the air-regulating flap 6, the pin 30 does not get under the arresting projection 32. Thereby the adjusting lever 23 remains so long in its initial position until an adjustment by hand is performed.

Figure 5:
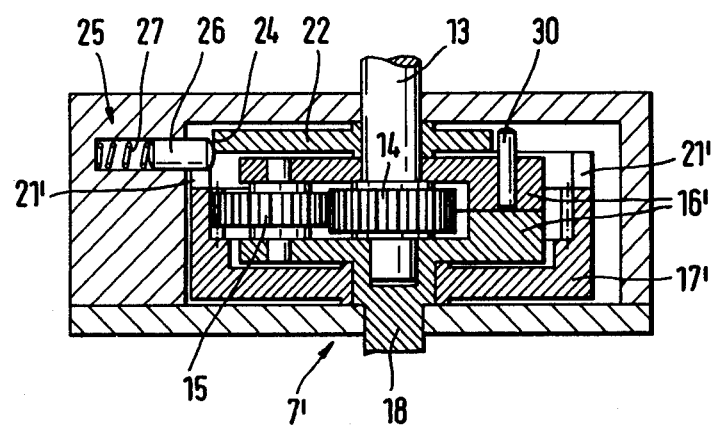
FIG. 5 is a view showing a longitudinal section of the air conditioning device in accordance with a second embodiment of the invention.

In the air conditioning device in accordance with the embodiment shown in FIG. 5, the output shaft 18 of a planetary transmission 7' is formed on a planetary gear carrier 16'. A hollow gear 17' is arranged rotatable about the planetary gear carrier 16' and has on its periphery recesses 21'. The input shaft 13, the sun gear 14, the planetary gears 15, the disk 22 with the cam 24, the arresting pin 26 and the spring 27 are formed in this embodiment similarly to the previously described embodiment. For separating the force transmission between the input shaft 13 and the output shaft 18, the hollow gear 17' is released by the cam 24. The manual adjustment is performed then in the above described manner via the pin 30 mounted on the planetary gear carrier 16'.

The air conditioning device in accordance with a further embodiment can be designed so that the input shaft is connected with the hollow gear, the air-regulating flap 6 is fixedly coupled with the planetary gear carrier, and the sun gear for forced transmission is prevented from rotation or for manual adjustment is released. In this case, however, smaller reductions to the low speed must be taken into consideration. It is also possible to provide different planetary transmissions, as compared with the transmission described above, in that such transmission can be provided for transmission to higher speeds and require more reducing reduction transmissions, for example a worm transmission.

It will be understood that each of the elements described above, or two or more together, may also find a useful application in other types of constructions differing from the types described above.

While the invention has been illustrated and described as embodied in an air conditioning device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An air conditioning device, particularly an air heating device for a power vehicle, comprising a control member; an electric motor operable in two directions of rotation and connectable with said control member so as to drive the latter; a planetary transmission arranged between said electric motor and said control member and including a first shaft driven by said electric motor, a second shaft fixedly connected with said control member, two planetary transmission elements including a hollow wheel and a planetary wheel carrier all supported rotatably; a spring actuated arresting member engageable with one of said transmission elements for preventing the same from rotation so that a rotation of said first shaft results in a rotation of said second shaft; a temperature regulator provided with a temperature sensor and switching said electric motor in different directions, depending upon sensing of air temperature by said temperature sensor; and manual adjusting means for selectively adjusting said control member, independently from adjustment by said electric motor, said manual adjusting means including a turnable adjusting lever which is formed and arranged so that said lever has a neutral position, when said lever is turned from said neutral position said arresting member is engaged and said one transmission element is loosely rotatable for interrupting the connection between said first shaft and said second shaft, and after engaging said arresting member said manual adjusting means engage with the other of said transmission elements which is continuously fixedly connected with said second shaft for adjusting said control member independently from whether and in which direction said electric motor rotates.

2. An air conditioning device as defined in claim 1, wherein said control member is formed as a flap.

3. An air conditioning device as defined in claim 1, wherein said electric motor is an adjusting motor.

4. An air conditioning device as defined in claim 1, and a releasing element arranged to release said arresting member.

5. An air conditioning device as defined in claim 4, wherein said releasing element is formed as a cam acting upon said arresting member to release the latter.

6. An air conditioning device as defined in claim 5, wherein said manual adjusting means also includes a disk which mounts said adjusting lever coaxially with said planetary wheel carrier, said disk being provided with said cam and arranged so that after releasing of said arresting member said disk is coupled with said other planetary transmission element which is fixedly connected with said control member.

7. An air conditioning device as defined in claim 6, wherein said arresting member is formed as an arresting pin extending substantially radially to a turning axis of said adjusting lever and loaded with a spring, said one planetary transmission element having a recess in which said arresting pin engages, said cam being arranged to act radially on said arresting pin.

8. An air conditioning device as defined in claim 7, wherein said recess has a circumferential path, said cam being arranged adjacent to said circumferential path of said recess so that one portion of said arresting pin extends toward said cam, whereas another portion of said arresting pin extends into said recess.

9. An air conditioning device as defined in claim 8, wherein said recess and said cam are located axially adjacent to one another, said parts of said arresting pin being also located axially adjacent to one another.

10. An air conditioning device as defined in claim 6, wherein said other planetary transmission element has a follower arranged thereon, said adjusting lever being provided with an abutment arranged so that after releasing of said arresting mechanism said abutment, during turning of said adjusting lever in its turning direction, engages with said follower.

11. An air conditioning device as defined in claim 10, wherein said follower is formed as a pin provided on said other planetary transmission element.

12. An air conditioning device as defined in claim 11, wherein said abutment has a spring with an arresting projection arranged to elastically engage over said pin which forms said follower.

13. An air conditioning device as defined in claim 1, wherein said transmission has a sun gear which connects said hollow shaft with said second shaft, said planetary wheel carrier having an arresting recess in which said arresting member engages.

14. An air conditioning device as defined in claim 1, wherein said transmission has a sun gear fixedly connected with said first shaft, said planetary wheel carrier being fixedly connected with said second shaft, said hollow shaft having a arresting recess in which said arresting member engages.

15. An air conditioning device as defined in claim 1, wherein said arresting member is formed as a spring-loaded arresting pin directed against said one transmission element.

* * * * *